(12) United States Patent
Yamamoto et al.

(10) Patent No.: US 7,872,820 B2
(45) Date of Patent: Jan. 18, 2011

(54) LENS BARREL AND IMAGE PICKUP APPARATUS

(75) Inventors: Harushige Yamamoto, Yamato (JP); Kazushige Ichino, Kokubunji (JP); Takumi Uehara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 12/500,784

(22) Filed: Jul. 10, 2009

(65) Prior Publication Data

US 2010/0014171 A1      Jan. 21, 2010

(30) Foreign Application Priority Data

Jul. 16, 2008    (JP) .............................. 2008-184761
Sep. 22, 2008    (JP) .............................. 2008-242467

(51) Int. Cl.
    *G02B 7/02*    (2006.01)
(52) U.S. Cl. .................. 359/822; 359/813; 348/E5.028
(58) Field of Classification Search ................ 359/811, 359/813, 819, 822, 823, 826; 348/E5.028
    See application file for complete search history.

(56) References Cited

U.S. PATENT DOCUMENTS

| 7,369,326 B2 * | 5/2008 | Yagyu et al. ................ 359/689 |
| 7,426,085 B2 | 9/2008 | Yoshitsugu et al. | |

| 2003/0147146 A1 | 8/2003 | Mikami |
| 2006/0098306 A1 | 5/2006 | Yoshitsugu et al. |

FOREIGN PATENT DOCUMENTS

| CN | 1769942 A | 5/2006 |
| JP | 11-271829 | 10/1999 |
| JP | 2006-259685 | 9/2006 |
| JP | 4028721 | 12/2007 |

OTHER PUBLICATIONS

The above referensce were cited in a Jul. 14, 2010 Chinese Office Action, which is enclosed with English Translation, that issued in Japanese Patent Application No. 200910158573.6.

* cited by examiner

*Primary Examiner*—William C Choi
(74) *Attorney, Agent, or Firm*—Cowan, Liebowitz & Latman, P.C.

(57) ABSTRACT

An image pickup apparatus enabling construction of a small bending optical system with high magnification. A first lens group is movably disposed toward an object on a first optical axis. A second lens group is movably disposed radially inward of the first lens group. The second lens group comprises a drive frame drivingly controlled along the first optical axis and a lens holding frame for holding the second lens group. A prism is disposed on the first optical axis, for bending light incident on the prism to thereby guide the light along a second optical axis. The prism is retracted along the second optical axis in a non-shooting state. In the non-shooting state, the second lens group is retracted and accommodated in a space defined by the drive frame and the lens holding frame and a space occupied by the prism in a shooting state.

7 Claims, 12 Drawing Sheets

LENS BARREL AND IMAGE PICKUP APPARATUS

BACKGROUND OF THE INVENTION

1. Field of the Invention

The present invention relates to an image pickup apparatus provided with an optical member drive mechanism for driving an optical member using a bending optical system, and a lens barrel including a bending photographic optical system comprised of a plurality of lens groups.

2. Description of the Related Art

Conventionally, a technique related to the above-mentioned type of image pickup apparatus has been disclosed in Japanese Patent Laid-Open Publication No. H11-271829.

More specifically, a camera (image pickup apparatus) disclosed in Japanese Patent Laid-Open Publication No. H11-271829 is provided with a one-sided cam ring open forward in an optical axis direction, and second and third group lenses are spring-urged toward the cam face of the cam ring, whereby the group lenses are drivingly controlled in the optical axis direction in accordance with a zooming operation.

Further, in the above-mentioned camera, in the case of collapsing the group lenses, a first group lens is retracted, with the second and third group lenses being partially held in contact with the body of the camera, whereby the group lenses are accommodated in the camera body after releasing the contact between the one-sided cam ring and the second and third group lenses. This realizes reduction of the thickness of the camera.

In the above-mentioned conventional technique, an optical system is formed as a photographic optical system having a 3-group configuration in which the first group lens and the second group lens are driven by a cam mechanism, and the third group lens is drivingly controlled by another drive source implemented e.g. by a stepper motor. In the case of collapsing the group lenses, the second group lens holding the third group lens is brought into contact with the camera body, and the first group lens is retracted into an accommodated position. In this case, space between the first group lens and the second group lens is reduced against spring force to whereby the reduction of the thickness is achieved.

However, in Japanese Patent Laid-Open Publication No. H11-271829, an optical system using a reflective optical element and a mechanism for retracting the reflective optical element for accommodation are not disclosed at all. In other words, the above-mentioned conventional technique is applicable only to a zoom optical system having low magnification, but not to an optical system using a reflective optical element compatible with high magnification.

As a lens barrel to be mounted on an image pickup apparatus, such as a digital camera, there has been known one provided with a photographic optical system of a bending type (hereinafter referred to as "the bending photographic optical system") comprised of a plurality of lens groups. In the bending photographic optical system, it is not required to arrange a plurality of lens groups in a straight line, and therefore it is possible to reduce the total length of the optical system required in the optical axis direction, to thereby reduce the thickness of the image pickup apparatus.

As an image pickup apparatus having such a bending photographic optical system configured as above, there has been disclosed one in which a light flux having passed through an object-side lens group is bent e.g. by a prism through approximately 90 degrees to be guided toward another lens group (see Japanese Patent No. 4028721). In this image pickup apparatus, the lens groups and the prism are connected by a guide shaft, and the prism is moved from its retract position to its reflecting position in accordance with an operation for causing the lens groups to project from the image pickup apparatus, and is moved to its retract position in accordance with an operation for causing the lens groups to be accommodated in the image pickup apparatus.

As an image pickup apparatus having the bending photographic optical system, there has been disclosed one having a so-called extendable lens barrel mounted thereon (see Japanese Patent Laid-Open Publication No. 2006-259685). According to Japanese Patent Laid-Open Publication No. 2006-259685, in a shooting mode, a reflective optical element is placed in a position for bending light rays incident through an extended object-side lens group, while in a non-shooting mode, the object-side lens group is retracted into a space emptied by a shift of the reflective optical element into its retract position.

In general, as the distance of travel of a lens group is longer, zoom magnification becomes higher. However, in the image pickup apparatus disclosed in Japanese Patent No. 4028721, a distance over which the lens group is projectable is limited by the configuration of the guide shaft connecting between the lens groups and the prism. Therefore, the projectable distance of the prism can be increased e.g. by prolonging the guide shaft, but the width of the image pickup apparatus has to be increased so as to accommodate the long guide shaft, which makes it impossible to achieve reduction of the thickness of the image pickup apparatus and high zoom magnification at the same time.

Further, Japanese Patent Laid-Open Publication No. 2006-259685 has disclosed no specific configuration for moving the reflective optical element. Accordingly, the image pickup apparatus disclosed in Japanese Patent Laid-Open Publication No. 2006-259685 cannot achieve both the shift of the reflective optical element to its retract position and reception of the object-side lens group into the shooting position of the reflective optical element.

As described above, none of the image pickup apparatuses, including the ones disclosed in Japanese Patent No. 4028721 and Japanese Patent Laid-Open Publication No. 2006-259685, each of which employs the conventional bending photographic optical system, can achieve reduction of the thickness and high zoom magnification at the same time.

SUMMARY OF THE INVENTION

The present invention provides an image pickup apparatus which makes it possible to construct a small bending optical system with high magnification.

Further, the present invention provides a lens barrel and an image pickup apparatus employing a bending photographic optical system, which make it possible to achieve both high zoom magnification and reduction of the thickness of the image pickup apparatus.

In a first aspect of the present invention, there is provided an image pickup apparatus comprising a first lens group that is movably disposed on an object side on a first optical axis, a second lens group that is movably disposed inward of the first lens group on the first optical axis, second lens group comprising a plurality of lenses, a drive frame drivingly controlled along the first optical axis, and a lens holding frame for holding the plurality of lenses, and a reflective optical element that is disposed on the first optical axis, and is configured to bend a light flux incident thereon along the first optical axis to thereby guide the light flux along a second optical axis, and to be retracted along the second optical axis when the image pickup apparatus is brought to a non-shooting state, wherein the lens holding frame has an abutment portion which is urged by the first lens group for retraction when the image pickup apparatus is brought to the non-shooting state, and wherein when the image pickup apparatus is in the non-shooting state, at least the second lens group is accommodated, for retraction, in a space defined by the drive frame and a rear part of the lens holding frame, and a space which the reflective optical element occupies when the image pickup apparatus is in a shooting state.

According to the image pickup apparatus of the present invention, it is possible to construct a small bending optical system with high magnification.

In a second aspect of the present invention, there is provided a lens barrel including a first lens group for taking in light rays incident thereon from an object side along a first optical axis, a barrel section coaxial with the first optical axis and supporting the first lens group, and a reflective section for bending the light rays emitted from the first lens group to thereby guide the light rays along a second optical axis intersecting the first optical axis, the barrel section extending toward the object side along the first optical axis or retracting toward an opposite side from the object side whereby the first lens group is moved along the first optical axis, wherein the barrel section comprises a fixed barrel formed with a first cam portion inclined with respect to a circumferential direction, and a second cam portion continuous with an object-side end of the first cam portion, and a movable barrel provided with a cam engaging part for slidable engagement with the first cam portion and the second cam portion, and wherein the reflective section is configured to be moved along the second optical axis between a standby position and a shooting position when the cam engaging part of the movable barrel is in engagement with the second cam portion of the fixed barrel.

According to the lens barrel of the present invention, the fixed barrel is formed with the first cam portion inclined with respect to the circumferential direction and the second cam portion continuous with the object-side one end of the first cam portion, and when the cam engaging part formed on the movable barrel is in engagement with the second cam portion formed in the fixed barrel, the reflective section for bending the light rays emitted from the first lens group to thereby guide the light rays along the second optical axis intersecting the first optical axis is moved between the standby position and the shooting position along the second optical axis. This makes it possible to extend the movable barrel along the first optical axis, when the apparatus is in a shooting state, whereas when the apparatus is in a non-shooting state, makes it possible retract the movable barrel into a space occupied by the reflective section when in the shooting position but emptied by a shift of the reflective section from the shooting position to the standby position. Therefore, it is possible to achieve both high zoom magnification and reduction of the thickness of the image pickup apparatus.

In a third aspect of the present invention, there is provided an image pickup apparatus comprising a lens barrel, wherein the lens barrel includes a first lens group for taking in light rays incident thereon from an object side along a first optical axis, a barrel section coaxial with the first optical axis and supporting the first lens group, and a reflective section for bending the light rays emitted from the first lens group to thereby guide the light rays along a second optical axis intersecting the first optical axis, the barrel section extending toward the object side along the first optical axis or retracting toward an opposite side from the object side whereby the first lens group is moved along the first optical axis, wherein the barrel section comprises a fixed barrel formed with a first cam portion inclined with respect to a circumferential direction, and a second cam portion continuous with an object-side end of the first cam portion, and a movable barrel provided with a cam engaging part for slidable engagement with the first cam portion and the second cam portion, and wherein the reflective section is configured to be moved along the second optical axis between a standby position and a shooting position when the cam engaging part of the movable barrel is in engagement with the second cam portion of the fixed barrel.

The features and advantages of the invention will become more apparent from the following detailed description taken in conjunction with the accompanying drawings.

DETAILED DESCRIPTION OF THE EMBODIMENTS

The present invention will now be described in detail with reference to the drawings showing preferred embodiments thereof.

Figure 1:
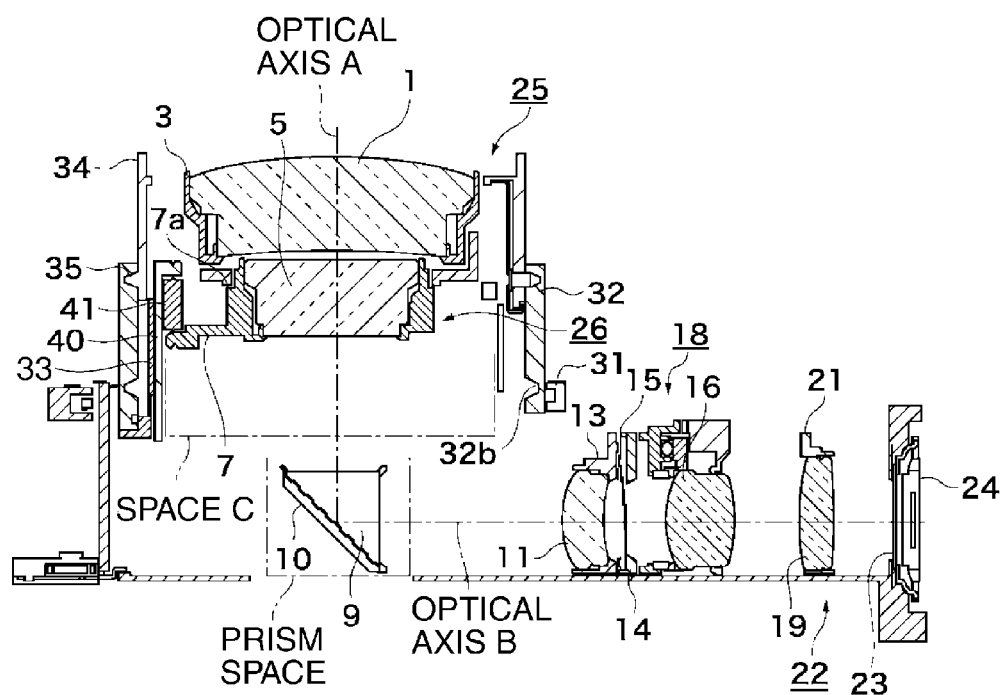
FIG. 1 is a view of essential parts of an image pickup apparatus according to an embodiment of the present invention, in a wide state in which a photographic optical system (lens barrel) is in a wide angle position.

FIG. 1 is a view of essential parts of an image pickup apparatus according to an embodiment of the present invention, in a wide state in which a photographic optical system (lens barrel) is in a wide angle state.

A first lens group 25 including a G1 lens 1 is held by a first-group lens holder 3.

A second lens group 26 including a G4 lens 5 is held by a second-group lens holder 7.

The first lens group 25 and the second lens group 26 form at least two object-side lens groups disposed toward an object side.

The second-group lens holder 7 is urged by action (resilient force) of a spring 41 in a direction along the optical axis A to be brought into abutment with a positioning abutment portion 40a (see FIG. 7) of a second-group holding member 40, whereby the second-group lens holder 7 is securely coupled to the second-group holding member 40.

The lens is driven by a drive source, such as a stepper motor, to advance or retract along an optical axis A in FIG. 1 to thereby perform a zooming operation. At this time, a space C appearing in FIG. 1 exists between the rear part of the second-group lens holder 7 and the second-group holding member 40.

A prism 9 is a reflective optical element functioning to bend the optical axis (photographic optical axis) A of light from an object, through 90 degrees. The light passing along the optical axis A (first optical axis) is guided by the prism 9 into a direction along an optical axis B substantially perpendicular to the optical axis A. The prism 9 is held by a prism holder 10 such that it can advance and retract along the optical axis B.

More specifically, when positioned on the first optical axis as the optical axis of the object-side lens groups, the prism 9 as the reflective optical element functions to bend the first optical axis such that it extends into a second optical axis, described hereinafter, and when the image pickup apparatus is placed into a non-shooting state, the prism 9 is retracted along the second optical axis.

A G7 lens 11 is configured to advance and retract along the optical axis B (second optical axis), and is rigidly secured to a front shutter base plate 13. A shutter and iris mechanism 15 is disposed at the rear of the G7 lens 11, and cooperates with a rear shutter base plate 14 so as to control the amount of photographic light.

At a location downstream of the shutter and iris mechanism 15, a G9 lens 16 is held by a holding member. The G9 lens 16 is supported in a manner movable along the optical axis B in unison with the rear shutter base plate 14. The G7 lens 11, the front shutter base plate 13, the rear shutter base plate 14, the shutter and iris mechanism 15, the G9 lens 16, and the holding member constitute a third lens group 18. The third lens group 18 advances and retracts, as required, along the optical axis B to thereby perform a zooming operation.

A fourth lens group 22 including a G10 lens 19 is held by a fourth-group lens holder 21.

The G10 lens 19 and the fourth-group lens holder 21 constitute the fourth lens group 22, and the fourth lens group 22 is driven, as required, by a drive source such as a stepper motor to advance or retract along the optical axis B to thereby perform a zooming operation and focusing operation.

On the front surface of an image pickup element 24, there is disposed an optical filter 23 having a low-pass filtering function for cutting off light having high spatial frequencies and a function for cutting off infrared light.

The photographic optical system is formed by component parts including the above-described lens groups. An object image is formed on the image pickup element 24, and the photographic image is converted into an electric signal, whereby an electronic image is obtained.

The first lens group 25 and the reflective optical element (prism 9) are driven by the same drive source. However, there is an area where the reflective optical element is not driven when the first lens group 25 is being moved along the first optical axis (optical axis A).

Figure 2:
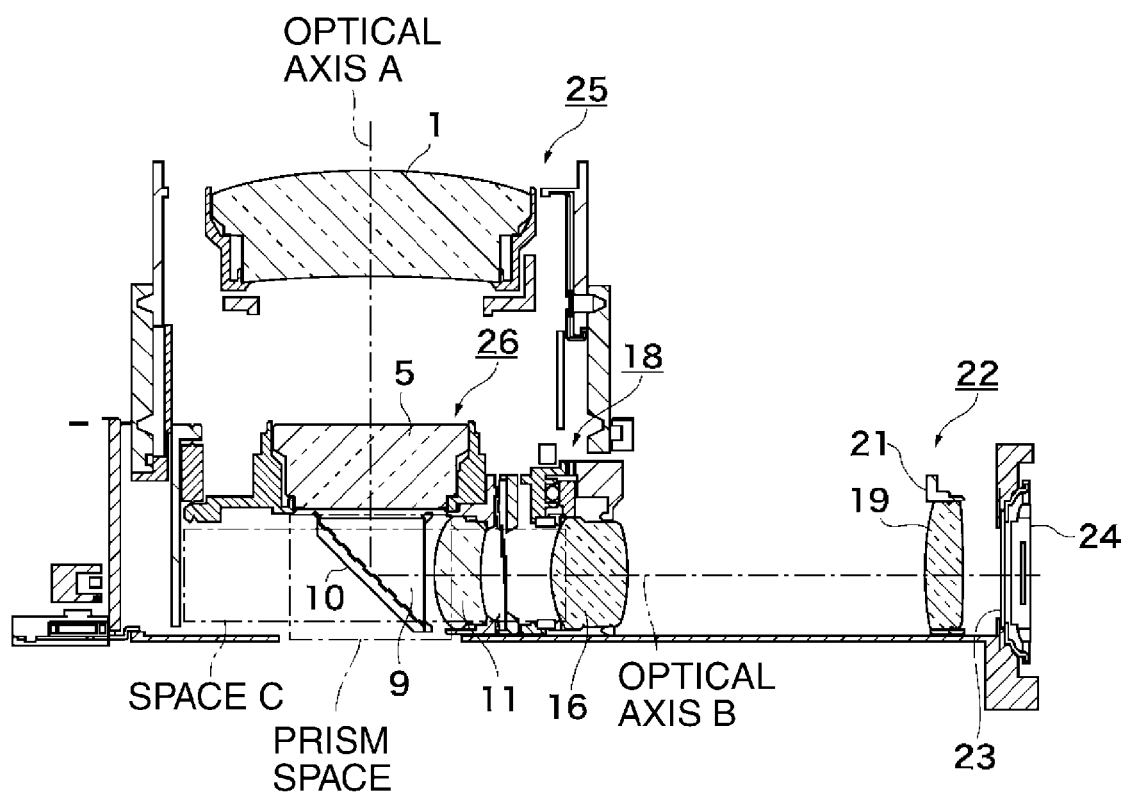
FIG. 2 is a view of the essential parts of the image pickup apparatus according to the embodiment, in a telephoto state in which the photographic optical system is in a long focus position.

FIG. 2 is a view of the essential parts of the image pickup apparatus according to the embodiment, in a telephoto state in which the photographic optical system is in a long focus position.

In contrast to the wide state in FIG. 1, the first lens group 25 is fixedly held in the same position, whereas the second lens group 26 has been driven e.g. by a stepper motor, not shown, to retract along the optical axis A to be positioned at a location close to the prism 9.

Similarly to the second lens group 26, the third lens group 18 is positioned at a location close to the prism 9 after having been driven along the optical axis B e.g. by a stepper motor, not shown. The fourth lens group 22 is also driven along the optical axis B e.g. by a stepper motor, not shown, to be stopped at a location close to the image pickup element 24.

Figure 3:
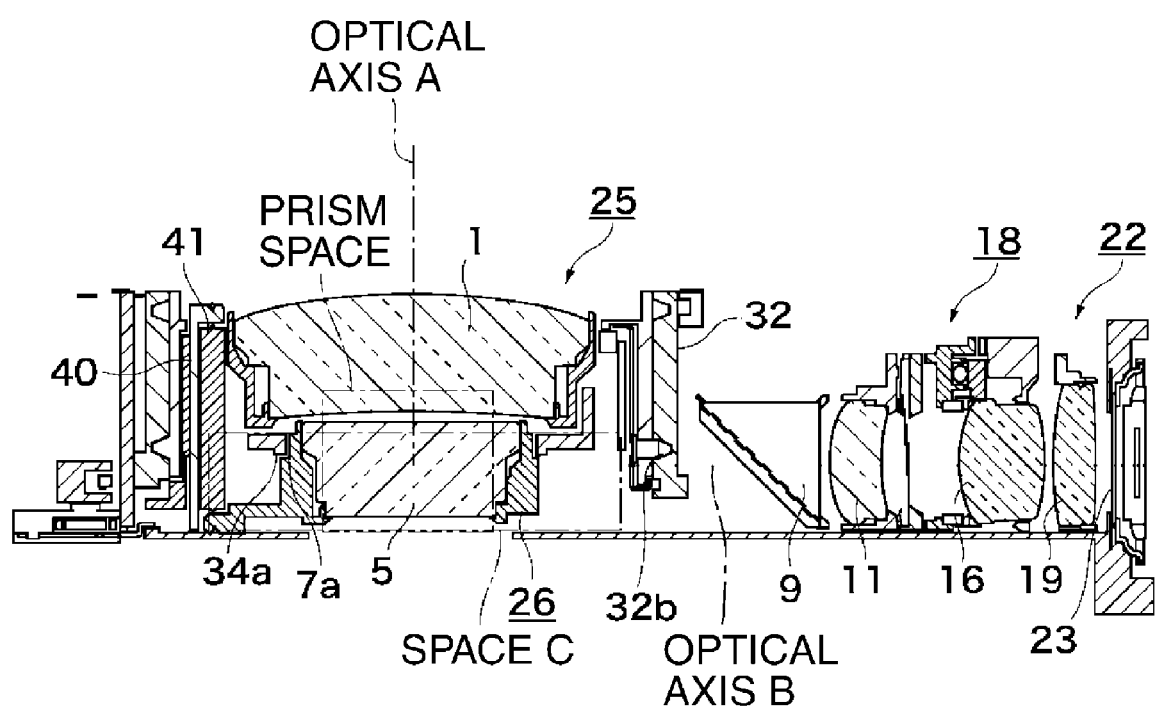
FIG. 3 is a view of the essential parts of the image pickup apparatus in FIGS. 1 and 2, with the photographic optical system in an accommodated state.

FIG. 3 is a view of the essential parts of the image pickup apparatus in FIGS. 1 and 2, with the photographic optical system in an accommodated state.

As described hereinafter, the prism 9 is driven along the optical axis B to a position retreated from the optical axis A, and in accordance with this operation of the prism 9, the second lens group 26 and the first lens group 25 are driven along the optical axis A to their accommodated position.

In the case of retracting the prism 9, the third lens group 18 and the fourth lens group 22 are retracted to respective positions where interference with the prism 9 can be avoided, whereby the accommodated state of the photographic optical system is secured. At this time, as shown in FIG. 3, the second lens group 26 has been retracted to a position overlapping part of the space where the prism 9 was positioned during shooting.

Further, in the case of securing the accommodated state of the photographic optical system, a second-group contact part 34a of a first-group barrel 34 is brought into contact with a flange 7a of the second-group lens holder 7 and thereby cause the second-group lens holder 7 to be retracted to its accommodated position against the urging force of the spring 41. As a consequence, as shown in FIG. 3, the second lens group 26 is accommodated in the space C formed between the rear part of the second-group lens holder 7 and the second-group holding member 40.

By thus retracting the second lens group 26 in the space where the prism 9 was positioned and the space C, it is possible to maximize the accommodation effect.

The second lens group 26 among the object-side lens groups, which faces the reflective optical element, is comprised of the drive frame (second-group holding member 40) that is driven along the first optical axis and the lens holding frame (second-group lens holder 7) that holds the second lens group 26.

The lens holding frame has the contact part (flange 7a) pressed and retracted by the first lens group 25 as one of the object-side lens groups, which is closer to the object, when the image pickup apparatus is in the non-shooting state. In the non-shooting state, at least the second lens group 26 is retracted and accommodated in the space formed between the drive frame and the rear part of the lens holding frame and the space where the reflective optical element was positioned during shooting.

Next, a drive mechanism for driving the first lens group 25 and a prism retracting mechanism will be described with reference to FIG. 4.

Figure 4:
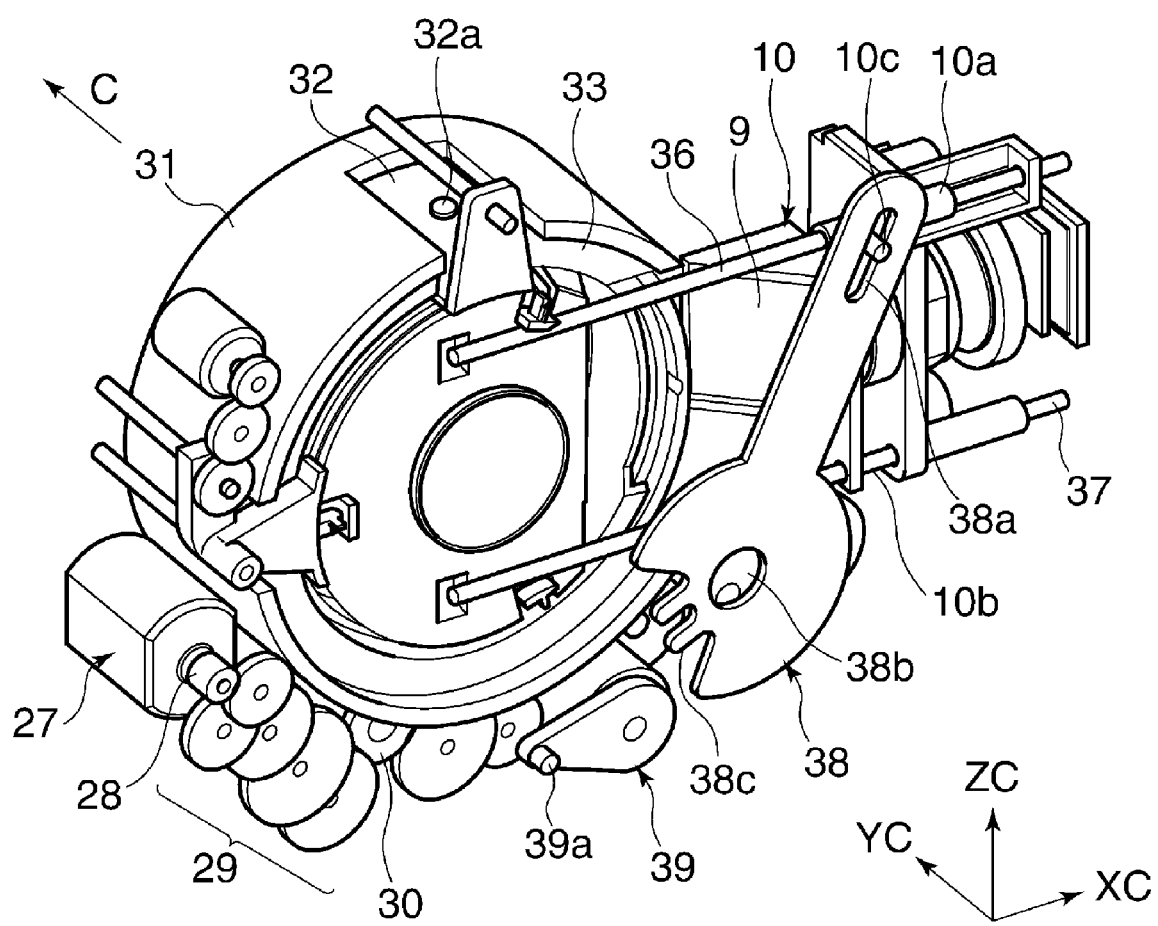
FIG. 4 is a perspective view of essential parts of the image pickup apparatus in FIGS. 1 and 2, with the photographic optical system in the accommodated state.

FIG. 4 is a perspective view of essential parts of the image pickup apparatus in FIGS. 1 and 2, with the photographic optical system held in the accommodated state.

A pinion gear 28 is press-fitted on the output shaft of a motor 27, and a reduction gear train 29 is gear-coupled to the pinion gear 28. As a final gear of the reduction gear train 29, a drive gear 30 extending along the optical axis A is mounted on a fixed barrel 31.

The fixed barrel 31 has an inner peripheral surface thereof formed with a cam groove 31*a* (see FIG. 6) described hereinafter, and a cam pin 32*a* fixed to or integrally formed with a differential barrel 32 comes into slidable engagement with the cam groove 31*a*. The differential barrel 32 is formed with a gear, not shown, in mesh with the drive gear 30. The differential barrel 32 is driven for rotation by receiving output from the drive gear 30.

At this time, the action of the cam groove 31*a* causes the differential barrel 32 to advance or retract along the optical axis A. A straight advance guide barrel 33 is fitted in the inner periphery of the differential barrel 32 such that the straight advance guide barrel 33 can perform relative rotation with respect to the differential barrel 32 and advance or retract in unison with the same along the optical axis A.

Further, the differential barrel 32 has an inner peripheral surface thereof formed with a cam groove 32*b* (see FIGS. 1 and 3). The first-group barrel 34 (see FIG. 1) holding the first lens group 25 is held between the inner peripheral surface of the differential barrel 32 and the outer peripheral surface of the straight advance guide barrel 33.

A cam pin 35 (see FIG. 1) fixed to or integrally formed with the first-group barrel 34 is slidably engaged with the cam groove 32*b*. A projection, not shown, projecting from the outer peripheral surface of the straight advance guide barrel 33 along the optical axis A is slidably engaged with an engagement groove formed in the inner peripheral surface of the first-group barrel 34, whereby the first-group barrel 34 is restrained from rotational motion.

When the differential barrel 32 receives driving force of the motor 27 and starts rotation, the engaging action between the cam groove 32*b* formed in the inner peripheral surface of the differential barrel 32 and the cam pin 35 of the first-group barrel 34 and that between the projection projecting from the straight advance guide barrel 33 and the engagement groove formed in the inner peripheral surface of the first-group barrel 34 are exerted, whereby the first-group barrel 34 advances or retracts along the optical axis A relative to the differential barrel 32.

As a consequence, as the differential barrel 32 advances or retracts along the optical axis A relative to the fixed barrel 31, the first-group barrel 34 further advances or retracts relative to the differential barrel 32, whereby the first lens group 25 is driven from its accommodated position to its shooting position.

The prism holder 10 holds the prism 9 therein. The prism holder 10 is formed with a guide bearing part 10*a* and a guide groove part 10*b* for engaging with respective two guide shafts 36 and 37 in a manner slidable along the optical axis B.

The guide bearing part 10*a* is formed with a pin 10*c* for engagement with a slide hole 38*a* of a prism drive lever 38, to cause the prism 9 to advance and retract along the optical axis B as described hereinafter. The prism drive lever 38 has a engaging hole 38*b* thereof slidably supported e.g. by a camera (image pickup apparatus) body, not shown.

A prism drive gear 39 is gear-coupled at a location downstream of the reduction gear train 29 and the drive gear 30. While the first-group barrel 34 is being extended to a shooting standby position along the optical axis A by receiving the driving force of the motor 27, the prism drive gear 39 performs clockwise rotation, as viewed in FIG. 4, and an engaging pin 39*a* continues idle rotation.

Then, after the first-group barrel 34 is set in its shooting position, the engaging pin 39*a* is engaged with a driven groove 38*c* of the prism drive lever 38, whereby the prism drive lever 38 is driven for counterclockwise pivotal motion about the engaging hole 38*b*.

This driving force causes the slide hole 38*a* of the prism drive lever 38 to drive the pin 10*c* of the prism holder 10 along the optical axis B, whereby the prism 9 is set in its shooting position.

Thus, the optical system of the lens barrel gets ready for shooting.

Figure 5:
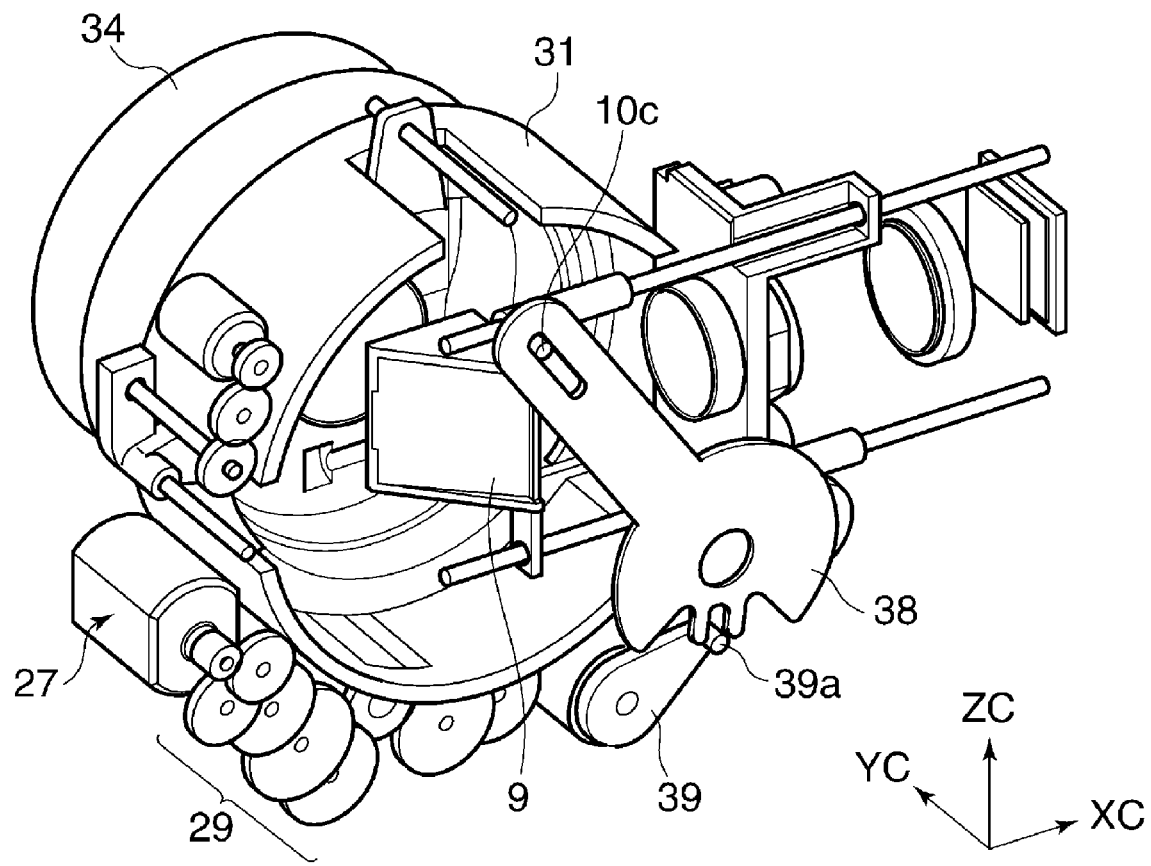
FIG. 5 is a perspective view of the essential parts of the image pickup apparatus, with a first lens group and a prism, appearing in FIG. 1, set in a shooting state.

FIG. 5 is a perspective view of the essential parts of the image pickup apparatus, with the first lens group 25 and the prism 9, appearing in FIG. 1, set in the shooting state.

In this state, the second lens group 26 is set in its shooting standby position by known support and drive means. As described hereinbefore, the motor 27 continues rotation even after the first-group barrel 34 has been extended to its shooting standby position and the second lens group 26 has also been extended to its shooting standby position.

The engaging pin 39*a* of the prism drive gear 39 comes into engagement with the driven groove 38*c* of the prism drive lever 38 to cause pivotal motion of the prism drive lever 38, and stops driving when the prism 9 is set in its shooting standby position shown in FIG. 5.

Figure 6:
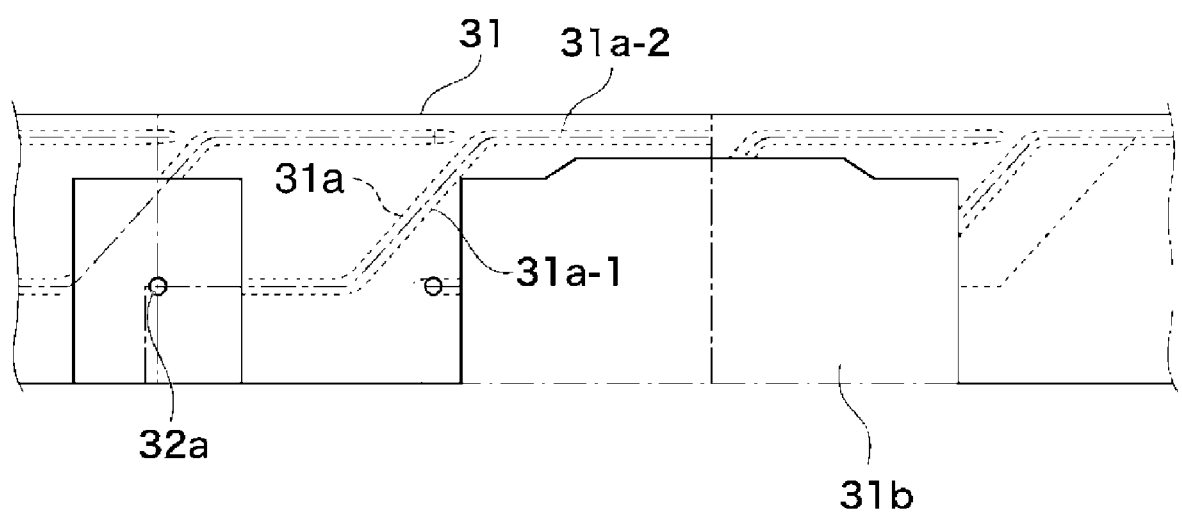
FIG. 6 is a development view of an outer peripheral surface of part of a fixed barrel, appearing in FIG. 4, which includes a cutout for enabling the prism to be shifted between a shooting position and a standby position.

FIG. 6 is a development view of an outer peripheral surface of part of the fixed barrel 31, appearing in FIG. 4, which includes a cutout 31*b* for enabling the prism 9 to be shifted between the shooting position and the standby position. Cam grooves formed in the inner peripheral surface of the fixed barrel 31 are indicated by dotted lines.

The fixed barrel 31 is formed with the cam groove 31*a* for slidable engagement with the cam pin 32*a* fixed to or integrally formed with the differential barrel 32.

The position of the cam pin 32*a* appearing in FIG. 6 corresponds to a state where the differential barrel 32 is held in its accommodated position. When the motor 27 starts rotation, the cam pin 32*a* is driven rightward, as viewed in FIG. 6, whereby the first lens group 25 is extended along the optical axis A while the cam pin 32*a* is moved in a first cam section 31*a*-1 of the cam groove 31.

Even after the cam pin 32*a* enters a second cam section 31*a*-2 of the cam groove 31, the differential barrel 32 continues rotation, but the first lens group 25 is held at rest in the extended state. When the cam pin 32*a* enters the second cam section 31*a*-2, the engaging pin 39*a* of the prism drive gear 39 drives the prism drive lever 38 to set the prism 9 in its shooting position.

An operation from the shooting state to the accommodated state is the reverse of the above-described operation. The prism 9 is retracted from the fixed barrel 31, and then the first lens group 25 and the second lens group 26 are received in the camera body.

Figure 7:
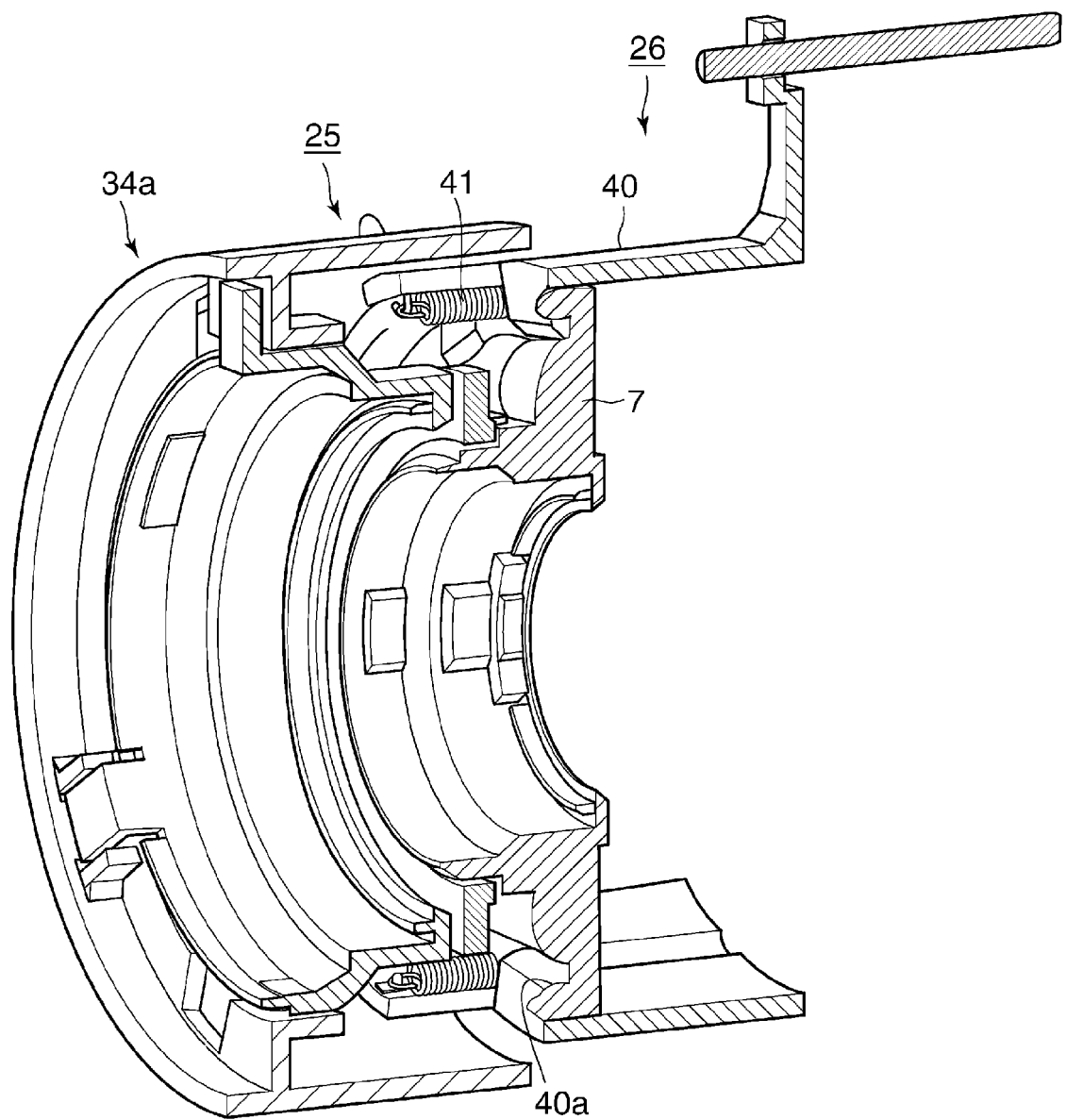
FIG. 7 is a sectional perspective view of essential parts including the first lens group and a second lens group, appearing in FIG. 1, set in a shooting (wide) state.

FIG. 7 is a sectional perspective view of essential parts including the first lens group 25 and the second lens group 26, appearing in FIG. 1, in the shooting (wide) state.

In this state, the second-group holding member 40 is urged in the direction along the optical axis A by the spring 41, as mentioned hereinbefore, and has its position along the optical axis A determined by the positioning abutment portion 40*a*, and is movable along the optical axis A in unison with the second-group holding member 40.

A lock mechanism described below is provided so as to prevent breakage of the second-group lens holder 7 and the prism holder 10 e.g. due to collision between the two, which can occur when the second-group lens holder 7 is disengaged from the second-group holding member 40 against the resilient force of the spring 41 due to external impact or an accidental drop of the image pickup apparatus.

Figure 8A:
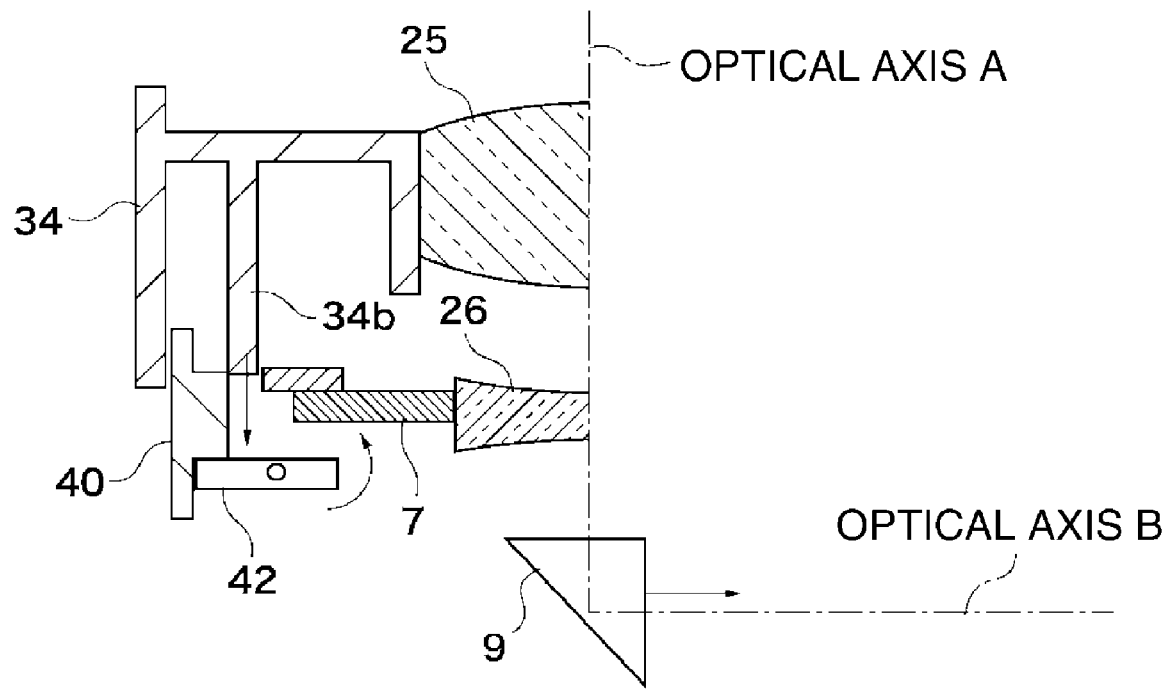
FIGS. 8A and 8B are cross-sectional views of essential parts of a lock mechanism of the image pickup apparatus in FIGS. 1 and 2.
Figure 8B:
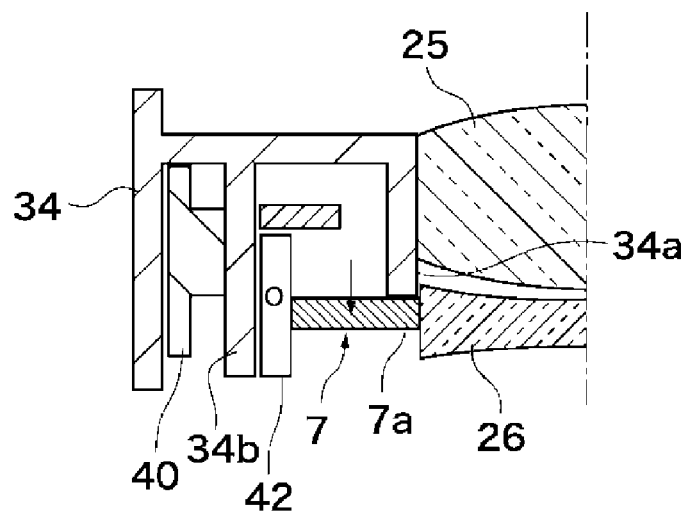

FIGS. 8A and 8B are cross-sectional views of essential parts of the lock mechanism of the image pickup apparatus in FIGS. 1 and 2.

In the shooting state shown in FIG. 8A, when a fall impact acting downward, as viewed in FIG. 8A, is applied to the second-group lens holder 7, the second-group lens holder 7 is not allowed to move by more than a predetermined amount due to interference with a lock lever (restriction member) 42 provided in the second-group holding member 40. This makes it possible to avoid breakage of the component parts.

For a transition from the shooting state to the non-shooting state, restriction by the lock lever (restriction member) 42 is released by the holding member (first-group barrel 34) holding the first lens group 25.

In this state, however, the second-group lens holder 7 cannot be retracted with respect to the second-group holding member 40 for being accommodated. Therefore, a lock release mechanism operates, as described below, to enable accommodation operation of the image pickup apparatus.

When the accommodation operation is started, i.e. when the prism 9 is retracted from the lens barrel along the optical axis B and then the first-group barrel 34 starts to retract along the optical axis A, first, a lock release part 34b of the first-group barrel 34 causes the lock lever 42 to perform counterclockwise pivotal motion against a resilient force of a spring, not shown.

When the lock lever 42 pivots through approximately 90 degrees as viewed in FIG. 8A, interference in the optical axis direction between the lock lever 42 and the second-group lens holder 7 is released.

Then, the second-group contact part 34a of the first-group barrel 34 is brought into contact with the flange 7a of the second-group lens holder 7 as shown in FIG. 8B, so that the second-group lens holder 7 can be retracted into its accommodated position against the urging force of the spring 41.

Figure 9:
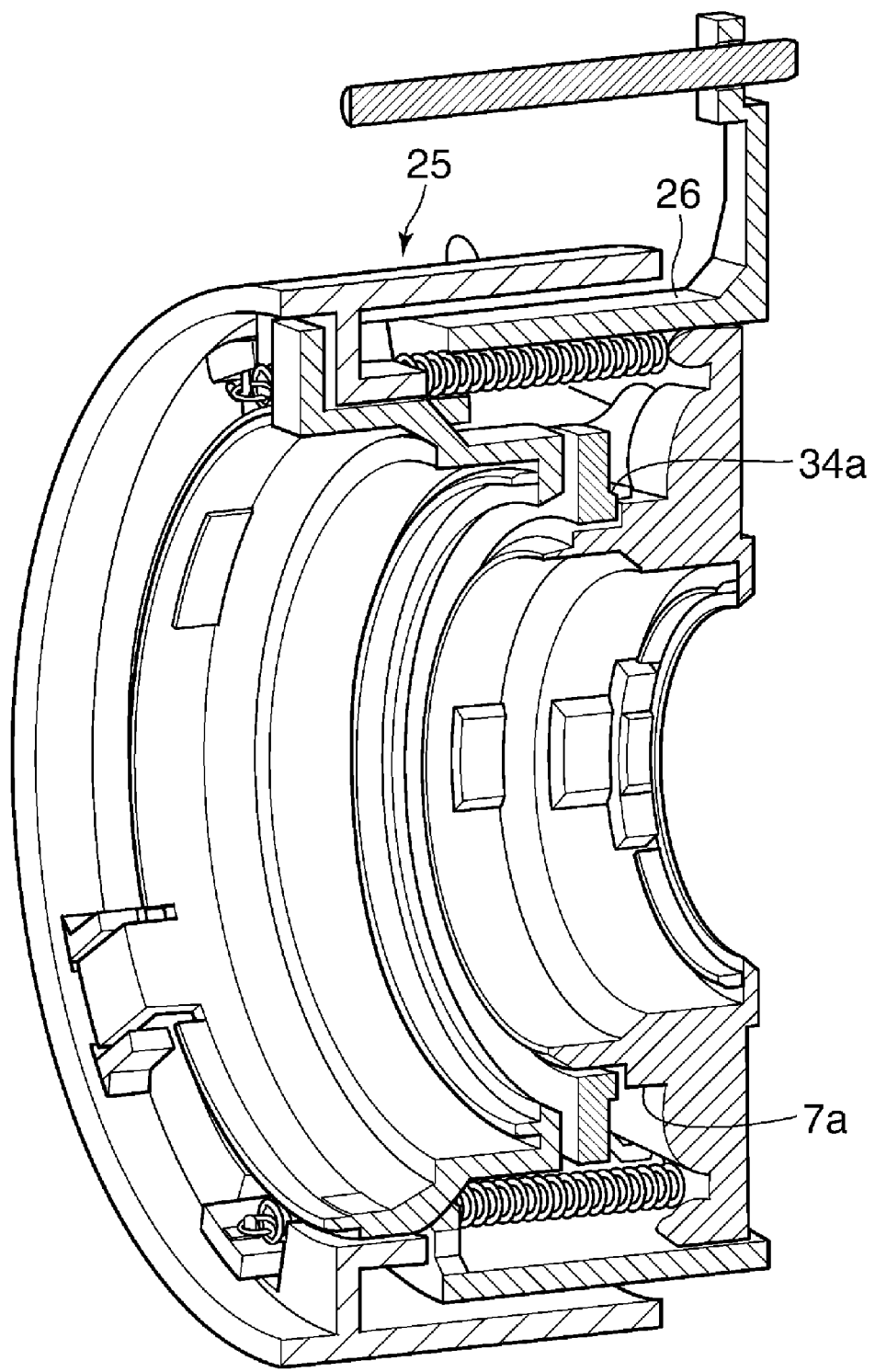
FIG. 9 is a sectional perspective view of the essential parts including the first lens group and the second lens group, appearing in FIG. 1, in the accommodated state.

FIG. 9 is a sectional perspective view of the essential parts including the first lens group 25 and the second lens group 26, appearing in FIG. 1, in the accommodated state.

The lock mechanism and the lock release mechanism for the second-group lens holder 7 are realized as described above, which makes it possible to achieve both size reduction and high impact resistance.

Hereafter, a second embodiment of the present invention will be described with reference to drawings. In the following description, component parts corresponding to those in the first embodiment are denoted by identical reference numerals.

A lens barrel 100 according to the present embodiment is roughly comprised of a bending photographic optical system, a lens drive mechanism, and a prism drive mechanism. The present embodiment is distinguished from the first embodiment in the bending photographic optical system and the lens drive mechanism, but the prism drive mechanism is substantially identical to that in the first embodiment. Therefore, in the following description, FIGS. 4 to 6 used for description of the first embodiment are referred to, on as-needed basis.

First, the bending photographic optical system of the lens barrel according to the present embodiment will be described with reference to FIGS. 10 to 12.

Figure 10:
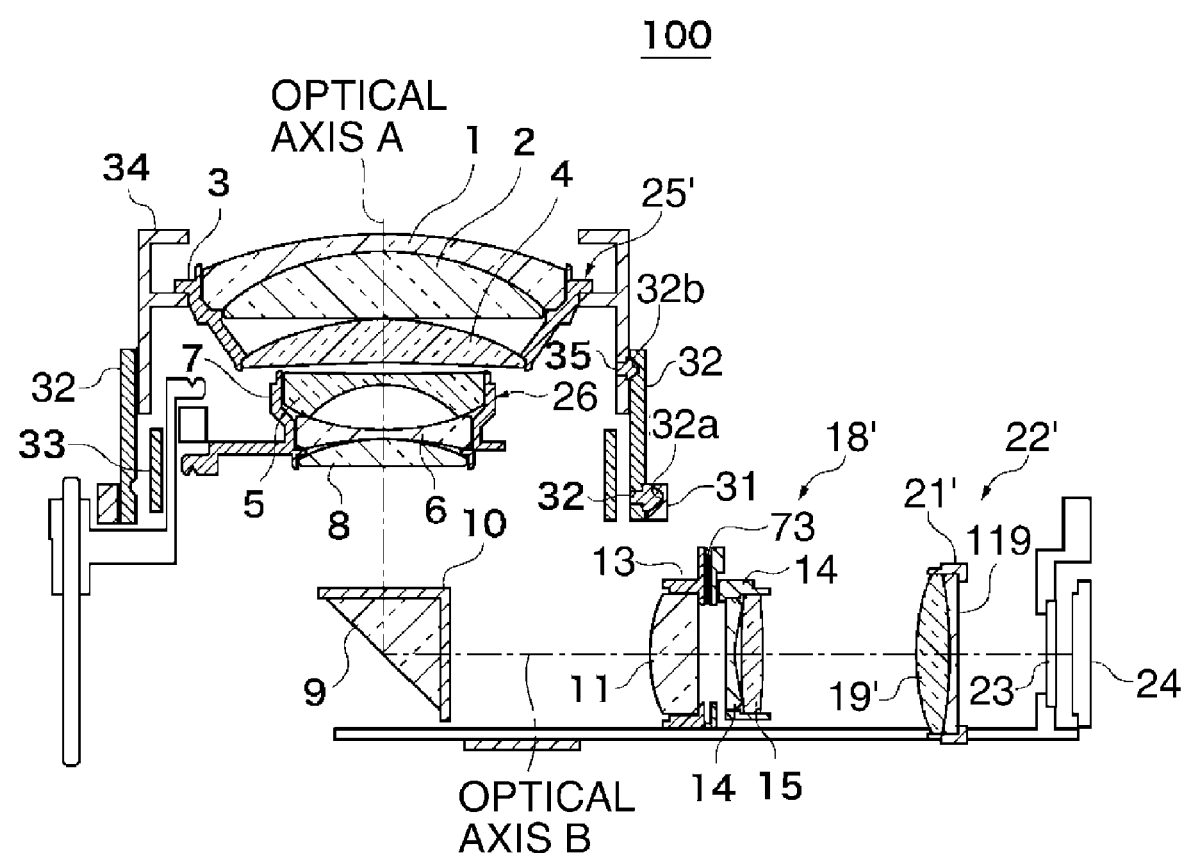
FIG. 10 is a schematic cross-sectional view of a lens barrel according to the present embodiment, in the wide state.

FIG. 10 is a schematic cross-sectional view of the lens barrel according to the present embodiment, in the wide state. FIG. 11 is a schematic cross-sectional view of the lens barrel in FIG. 10, in the telephoto state. FIG. 12 is a schematic cross-sectional view of the lens barrel in FIG. 10, in the accommodated state. In the following description of the lens barrel 100, the object side (upper side as viewed in FIG. 10) on the optical axis A (first optical axis) will be referred to as "the front in the direction of the optical axis A", and a side on the optical axis A, closer to the intersection with the optical axis B (i.e. a side remote from an object) will be referred to as "the rear in the direction of the optical axis A", for convenience of description. Further, a side on the optical axis B (second optical axis) orthogonal to the optical axis A, closer to the intersection with the optical axis A will be referred to as "the front in the direction of the optical axis B", and a side on the optical axis B, remote from the intersection as "the rear in the direction of the optical axis B".

As shown in FIG. 10, the bending photographic optical system of the lens barrel 100 is basically comprised of a first lens group 25' positioned closest to the object side, a second lens group 26' and a prism 9 (reflective section) sequentially disposed rearward of the first lens group 25' in the direction of the optical axis A, and a third lens group 18', a fourth lens group 22', an optical filter 23, and an image pickup element 24 sequentially positioned rearward of the prism 9 in the direction of the optical axis B.

The first lens group 25' positioned closest to the object side is formed by combining a G1 lens 1 and a G2 lens 2 laminated on each other via respective curved surfaces thereof, and a G3 lens 4. The first lens group 25' is mounted in a first-group lens holder 3. The first-group lens holder 3 is held in a first-group barrel 34 which serves as a component of a barrel section, described hereinafter. With this arrangement, the first lens group 25' can advance or retract along the optical axis A in accordance with forward or backward motion of the first-group barrel 34 along the optical axis A, which is caused by extension or retraction of the barrel section driven by a lens drive mechanism, described hereinafter.

The second lens group 26' positioned rearward of the first lens group 25' in the direction of the optical axis A is formed by combining a G4 lens 5 and a G5 lens 6 associated into a known marginal contact structure, and a G6 lens 8, and is mounted in a second-group lens holder 7. The second lens group 26' is electrically connected to a drive source, not shown, such as a stepper motor, and is driven by the drive source to advance or retract along the optical axis A. With this forward or backward motion of the second lens group 26', a picked-up image can be zoomed in or out.

The prism 9 positioned rearward of the second lens group 26' in the direction of the optical axis A is held by a prism holder 10. The prism 9 bends light rays incident thereon through approximately 90 degrees to emit the same as light rays B. The prism holder 10 is slidably engaged with guide shafts 36 and 37 (support unit) forming the prism drive mechanism, described hereinafter. This slidable engagement enables the prism 9 to advance or retract along the optical axis B. It should be noted that the arrangement of the prism holder 10 and the guide shafts 36 and 37 will be described in detail hereinafter in a description of the prism drive mechanism with reference to FIG. 12.

The third lens group 18' positioned rearward of the prism 9 in the direction of the optical axis A is formed by combining a G7 lens 11, a G8 lens 114, and a G9 lens 115 sequentially arranged in the mentioned order, such that the G7 lens 11 faces toward the prism 9. The G7 lens 11 is mounted in a front shutter base plate 13, and the G8 lens 114 and the G9 lens 115 are mounted in a rear shutter base plate 14. The front shutter base plate 13 and the rear shutter base plate 14 are fixed to each other e.g. by screws. Further, a shutter 73 is inserted between the front shutter base plate 13 and the rear shutter base plate 14 in a manner perpendicularly slidable with respect to the optical axis B.

Similarly to the prism holder 10, the front shutter base plate 13 and the rear shutter base plate 14 are slidably engaged with the guide shafts 36 and 37, and are electrically connected to a drive source, not shown, implemented e.g. by a stepper motor. The front shutter base plate 13 and the rear shutter base plate 14 are driven by the drive source to thereby advance or retract the third lens group 18' along the optical axis B. The third lens group 18' moves along the optical axis B, whereby a picked-up image can be zoomed in or out.

The fourth lens group 22' positioned rearward of the third lens group 18' in the direction of the optical axis B is formed by laminating a G10 lens 19' and a G11 lens 119 on each other, and is mounted in a fourth-group lens holder 21'. Similarly to the front shutter base plate 13 and the rear shutter base plate 14, the fourth-group lens holder 21' is slidably engaged with the guide shafts 36 and 37, referred to hereinafter, and are electrically connected to a drive source, not shown, implemented e.g. by a stepper motor. The fourth-group lens holder 21' is driven by the drive source to thereby advance or retract the fourth lens group 22' along the optical axis B. The advancement and retraction of the fourth lens group 22' along the optical axis B makes it possible to perform zooming and focusing of a picked-up image.

An image pickup section positioned rearward of the fourth lens group 22' in the direction of the optical axis B is comprised of the image pickup element 24, and the optical filter 23 disposed between the fourth lens group 22' and the image pickup element 24. The optical filter 23 has a low-pass filtering function for cutting off light with high spatial frequency and a function for cutting off infrared light. The image pickup section has a function for causing light rays incident thereon to form an image and then converting the image into an electric signal.

Further, in FIG. 10, there are shown a fixed barrel 31 formed with a cam groove 31a, a differential barrel 32 formed with a cam groove 32b and a cam pin 32a, a straight advance guide barrel 33, and a first-group barrel 34 formed with a cam pin 35, as components of the barrel section of the lens barrel 100. The arrangement and operation of the barrel section will be described in detail with reference to FIGS. 4 to 6.

In the bending photographic optical system constructed as above, light rays incident on the first lens group 25' along the optical axis A enters the prism 9 via the second lens group 26'. The light rays having entered the prism 9 are bent in the direction of the optical axis B to be output from the prism 9 and reach the optical filter 23 via the third lens group 18' and the fourth lens group 22'. Then, the light rays having passed through the optical filter 23 forms an image on the image pickup element 24, and the formed optical image is converted into an electric signal by the image pickup element 24, whereby an electronic photograph is obtained. When the lens barrel 100 is in the wide state shown in FIG. 10, it is possible to perform wide-angle shooting.

Figure 11:
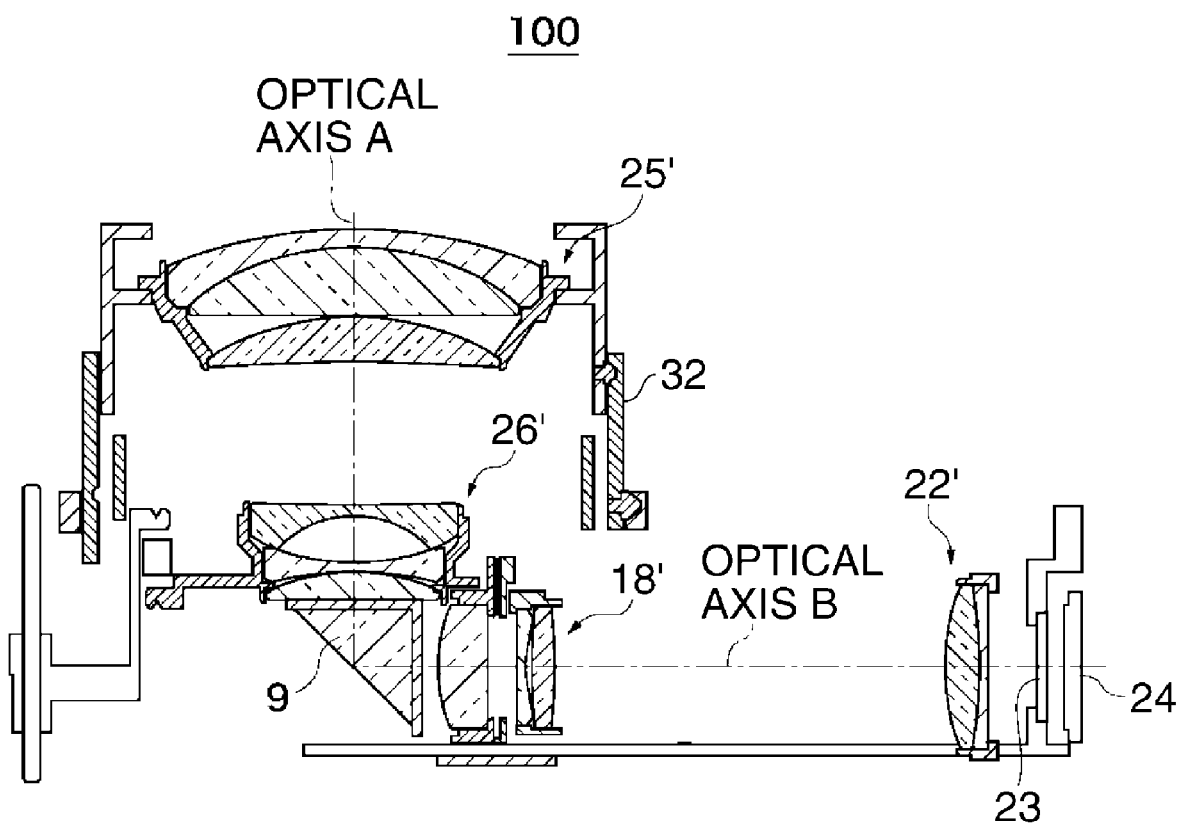
FIG. 11 is a schematic cross-sectional view of the lens barrel in FIG. 10, in the telephoto state.

On the other hand, when the lens barrel 100 is in the telephoto state shown in FIG. 11, it is possible to perform shooting with long focus. If the positions of the respective components of the bending photographic optical system in the telephoto state are compared with those in the wide state, the first lens group 25' is positioned at the same location as in the wide state, but the second lens group 26' is driven by the associated drive source to be shifted rearward along the optical axis A to a position closer to the prism 9. The third lens group 18' is driven by the associated drive source to be shifted frontward along the optical axis B to a position closer to the prism 9. The fourth lens group 22' is driven by the associated drive source to be shifted rearward along the optical axis B to a position closer to the image pickup element 24.

Figure 12:
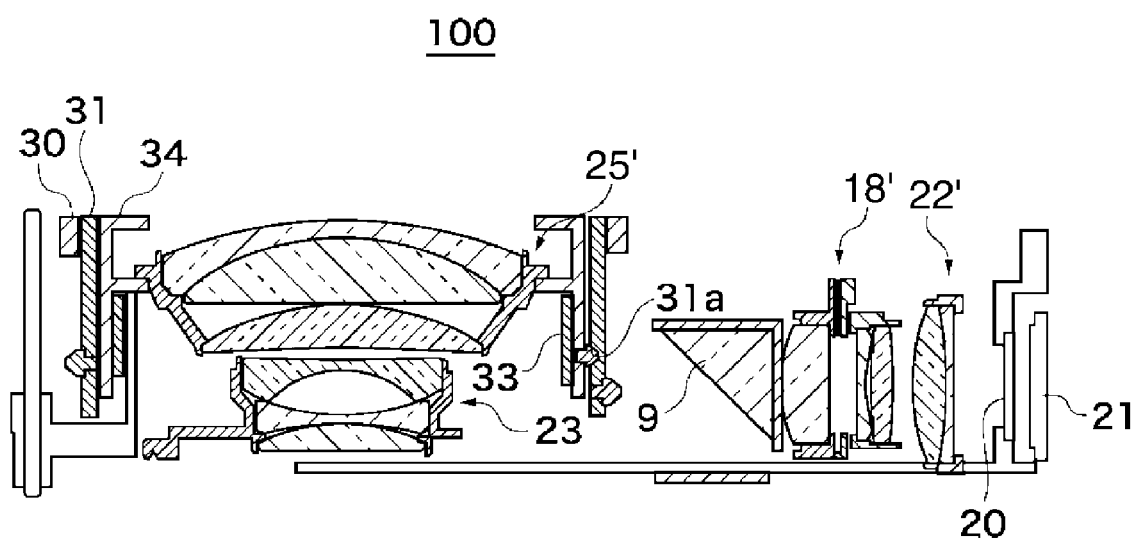
FIG. 12 is a schematic cross-sectional view of the lens barrel in FIG. 10, in the accommodated state.

Further, when the lens barrel 100 is in the accommodated state shown in FIG. 12, in contrast to the wide state, the third lens group 18' and the fourth lens group 22' are driven by the respective drive sources to be shifted rearward along the optical axis B to respective positions closer to the image pickup element 24. The prism 9 is driven by the prism drive mechanism (see FIG. 4) to be shifted along the optical axis B from the shooting position where the optical axis A and the optical axis B intersects to a standby position rearward of the shooting position in the direction of the optical axis B. A space occupied by the prism 9 in the shooting position but emptied by the shift of the prism 9 receives the second lens group 26' driven by the associated drive source and the first lens group 25' driven by the lens drive mechanism described hereinafter.

Next, the arrangement and operation of the lens drive mechanism of the lens barrel 100, which is comprised of a barrel section and a drive section, will be described with reference to FIGS. 4 and 6.

FIG. 4 shows the arrangement of the lens barrel according to the embodiment of the present invention in the accommodated state.

As shown in FIG. 4, the lens barrel 100 includes the fixed barrel 31 to be secured to an image pickup apparatus to which the lens barrel 100 is mounted, and the fixed barrel 31 has the differential barrel 32 (moving barrel), the first-group barrel 34, and the straight advance guide barrel 33 sequentially arranged therein in a radial direction (see FIG. 10). Each of the fixed barrel 31, the differential barrel 32, the first-group barrel 34, and the straight advance guide barrel 33 is a hollow cylindrical member having the optical axis A as an axial center, and these hollow cylindrical members basically form the barrel section.

First, a description will be given of the fixed barrel 31. It should be noted that the fixed barrel 31 is secured to the image pickup apparatus as described above, and hence it cannot move from a predetermined position on the image pickup apparatus.

As shown in FIG. 6, the cutout 31b is formed in an end of the fixed barrel 31 on a side remote from an object (lower side as viewed in FIG. 6) at an intermediate area between the shooting position and the standby position of the prism 9. The cutout 31b is sufficiently large to allow the prism 9 to pass therethrough. The prism 9 passes through the cutout 31b to thereby shift from the shooting position radially inside the fixed barrel 31 to the standby position radially outside the fixed barrel 31.

Further, the fixed barrel 31 has an inner peripheral surface thereof formed with a plurality of cam grooves, and the cam pin 32a of the differential barrel 32, described hereinafter, engages with one of them. The cam groove 31a has a first cam section 31a-1 (first cam portion) formed to be inclined with respect to the circumferential direction (transverse direction as viewed in FIG. 6) and a second cam section 31a-2 (second cam portion) formed in parallel with the edge of the fixed barrel 31. The first cam section 31a-1 is formed such that it extends from a portion in the vicinity of the left side, as viewed in FIG. 6, of the cutout 31b, and the second cam section 31a-2 is formed such that it continues from an object-side end (upper end as viewed in FIG. 6) of the first cam section 31a-1. The second cam section 31a-2 of the connection cam section is formed in an area adjacent to the cutout 31b in the direction of the optical axis A (i.e. an area upward, as viewed in FIG. 6, of the cutout 31b). It should be noted that the term "parallel" in the present specification is not strict in the geometrical sense, but it is a concept including a state slightly inclined with respect to the circumferential direction of the fixed barrel 31.

Referring again to FIG. 4, a motor 27 as a drive source is secured on the outer peripheral surface of the fixed barrel 31. The motor 27 is implemented by a known motor, and a pinion gear 28 is press-fitted on the output shaft of the motor 27. Connected to the pinion gear 28 is a reduction gear train 29 for sequentially transmitting rotation of the pinion gear 28 in accordance with driving by the motor 27. A drive gear 30 secured on the outer peripheral surface of the fixed barrel 31 is disposed adjacent to a final gear of the reduction gear train 29 to receive rotation from the pinion gear 28. With this arrangement, driving force of the motor 27 is transmitted to the drive gear 30. The drive section is basically comprised of the motor 27, the reduction gear train 29, and the drive gear 30.

Next, a description will be given of the arrangement and operation of the differential barrel 32.

On the outer peripheral surface of the differential barrel 32 disposed radially inward of the fixed barrel 31, there is formed the cam pin 32a (cam engaging part) (see FIG. 10) for slidable engagement with the cam groove 31a. It should be noted that the cam pin 32a may be fixed to or integrally formed with the differential barrel 32. Further, the outer peripheral surface of the differential barrel 32 is formed with a gear section, not shown, in mesh with the drive gear 30. With this arrangement, the differential barrel 32 receives output from the drive gear 30 to be driven for rotation. Further, the inner peripheral surface of the differential barrel 32 is formed with the cam groove 32b for engagement with the cam pin 35 of the first-group barrel 34, described hereinafter (see FIG. 10).

In the lens barrel 100 in the state shown in FIG. 4, when the differential barrel 32 receives output from the drive gear 30 and starts rotation, the cam pin 32a of the differential barrel 32, which can be viewed in the upper part, as viewed in FIG. 4, of the lens barrel 100, is moved in a clockwise direction, from the position shown in FIG. 4 to be brought into engagement with the cam groove 31a of the fixed barrel 31. The cam pin 32a engaged with the cam groove 31a slides along the cam groove 31a, whereby the differential barrel 32 is moved in a direction indicated by an arrow C.

Now, this operation of the differential barrel 32 will be described with reference to FIG. 6. When the differential barrel 32 receives output from the drive gear 30, the cam pin 32a moves rightward from a position illustrated in FIG. 6, to come into engagement with the cam groove 31a formed in the inner peripheral surface of the fixed barrel 31. The cam pin 32a slides along the cam groove 31a to enter the first cam section 31a-1, and then slides rightwardly upward, as viewed in FIG. 6, along the inclined first cam area 31a-1. In accordance with the rightwardly upward movement, as viewed in FIG. 6, of the cam pin 32a engaged with the first cam section 31a-1, the differential barrel 32 moves toward the object side (upward as viewed in FIG. 10) while rotating about the optical axis A.

Thereafter, the cam pin 32a enters the second cam section 31a-2 from the first cam section 31a-1, and further slides rightward as viewed in FIG. 6. The second cam section 31a-2 is not inclined with respect to the circumferential direction of the fixed barrel 31, and therefore while the cam pin 32a engaged with the second cam section 31a-2 is sliding rightward as viewed in FIG. 6, the differential barrel 32 rotates about the optical axis A without moving toward the object side.

Next, a description will be given of the construction and operation of the straight advance guide barrel 33.

The straight advance guide barrel 33 disposed radially inward of the differential barrel 32 is configured to be rotatable relative to the differential barrel 32, and advance and retract along the optical axis A in unison with the differential barrel 32. This configuration can be achieved e.g. by combining the differential barrel 32 and the straight advance guide barrel 33 into a unit using a bayonet structure, and restricting the rotation of the straight advance guide barrel 33 by cam action with the fixed barrel 31. With this configuration, the straight advance guide barrel 33 advances straight forward along the optical axis A not following the rotation of the differential barrel 32, but following only the straight advance of the same in the direction of the optical axis A. Further, on the outer peripheral surface of the straight advance guide barrel 33, there is formed a linear rotation-restricting key for restricting the rotation of the first-group barrel 34 described below.

Next, a description will be given of the construction and operation of the first-group barrel 34 holding the first lens group.

On the outer peripheral surface of the first-group barrel 34 disposed radially inward of the differential barrel 32 and radially outward of the straight advance guide barrel 33, there is formed the cam pin 35 for slidable engagement with the cam groove 32b of the differential barrel 32 (see FIG. 10). It should be noted that the cam pin 35 may be fixed to or integrally formed with the first-group barrel 34. Further, in the inner peripheral surface of the first-group barrel 34, there is formed a linear cam groove for slidable engagement with the linear rotation-restricting key formed on the outer peripheral surface of the straight advance guide barrel 33.

The first-group barrel 34 is caused to follow the movement of the differential barrel 32 toward the object side by the cam action between the cam pin 35 formed on the outer peripheral surface of the first-group barrel 34 and the cam groove 32b of the differential barrel 32. On the other hand, the rotation of the first-group barrel 34 is restricted by the cam action between the linear cam groove formed in the inner peripheral surface of the first-group barrel 34 and the rotation-restricting key of the straight advance guide barrel 33 that performs only linear motion. Therefore, the first-group barrel 34 advances straight forward along the optical axis A in accordance with the motion of the differential barrel 32 while having its rotation restricted by the straight advance guide barrel 33.

As described above, the lens drive mechanism is configured such that when the motor 27 starts driving, the rotation and straight advance of the differential barrel 32, the straight advance of the straight advance guide barrel 33, and the straight advance of the first-group barrel 34 are performed in an interlocked manner. This configuration of the lens drive mechanism enables the lens barrel 100 to extend the barrel section toward the object side to thereby move the first lens group 25' e.g. from its accommodated position shown in FIG. 12 to its shooting position shown in FIG. 10 or FIG. 12. On the other hand, by retracting the barrel section toward the reflective section side, it is possible to move the first lens group 25' from the shooting position to the accommodated position.

Next, the arrangement and operation of the prism drive mechanism in the lens barrel 100 will be described with reference to FIGS. 4 and 5.

As shown in FIG. 4, the lens barrel 100 has the prism holder 10, the guide shafts 36 and 37, prism drive lever 38, and a prism drive gear 39 as components of the prism drive mechanism.

The prism holder 10 holding the prism is formed with a guide bearing part 10a through which the guide shaft 36 extends and a guide groove part 10b for engagement with the guide shaft 37. The guide bearing part 10a is slidable relative to the guide shaft 36 and the guide groove part 10b is slidable relative to the guide shaft 37. The guide bearing part 10a is formed with a pin 10c for engagement with a slide hole 38a of the prism drive lever 38.

The bar-like guide shafts 36 and 37 extend parallel with the optical axis B, and are disposed such that one ends of the respective guide shafts 36 and 37 are positioned radially inside the fixed barrel, as viewed in plan view in the direction of the optical axis A. The guide shafts 36 and 37 slidably support the prism 9, the third lens group 18', and the fourth lens group 22' in the mentioned order from front to rear along the optical axis B.

The prism drive lever 38 is comprised of a handle part in the form of a flat plate and a disk part also in the form of a flat plate. The handle part is formed with the slide hole 38a, which is slit-shaped, and the disk part has a central part thereof formed with an engaging hole 38b having a circular shape and a front end formed with driven grooves 38c each having a comb-tooth shape, for engagement with an engaging pin 39a, referred to hereinafter. The pin 10c of the prism holder 10 is slidably engaged with the slide hole 38a, and a component part of the image pickup apparatus is slidably engaged with the engaging hole 38b.

The prism drive gear 39, which is water drop-shaped, secured on the outer peripheral surface of the fixed barrel 31 is in mesh with the drive gear 30, and is driven for rotation in accordance with output from the motor 27. The prism drive gear 39 has a pointed end thereof formed with the engaging pin 39a. As the prism drive gear 39 is driven for rotation in accordance with output from the motor 27, the engaging pin 39a is rotated through a predetermined angle from a position shown in FIG. 4, and is then brought into engagement with one of the driven grooves 38c of the prism drive lever 38. The prism drive gear 39 continues rotation even after engagement of the engaging pin 39a with the driven groove 38c, so that the prism drive lever 38 is driven by the cam action of the engaging pin 39a.

The prism drive lever 38 having been driven rotates about the engaging hole 38b, whereby the handle part positioned rightward, as viewed in FIG. 4, of the disk part is inclined leftward, as viewed in FIG. 4 (see FIG. 5). In accordance with the rotation of the prism drive lever 38, the pin 10c engaged with the slide hole 38a also moves leftward, as viewed in FIG. 4, along the guide shafts 36 and 37, whereby the prism 9 held by the prism holder 10 is moved forward along the optical axis B from the standby position shown in FIG. 4 to the shooting position shown in FIG. 5.

As described above, the prism drive mechanism is configured such that the prism drive lever 38 and the prism holder 10 operate in a manner interlocked with the rotation of the prism drive gear 39. This makes it possible to shift the component parts of the lens barrel 100 e.g. from the accommodated state shown in FIG. 4 to the shooting position shown in FIG. 5.

The lens drive mechanism and the prism drive mechanism are both driven by the motor 27 as a common drive source, and hence they are driven in an interlocked manner.

Now, a description will be given of an interlock between the lens drive mechanism and the prism drive mechanism. Referring to FIG. 4, when the pinion gear 28 is driven by the motor 27 to rotate, the gears of the reduction gear train 29 are sequentially rotated to cause rotation of the drive gear 30. In accordance with the rotation of the drive gear 30, the differential barrel 32 is driven for rotation, and the straight advance guide barrel 33 and the first-group barrel 34 move forward along the optical axis A in a manner interlocked with the rotation of the differential barrel 32, whereby the barrel section is extended to move the first lens group 25' forward along the optical axis A. In accordance with the advance of the first lens group 25' along the optical axis A, the second lens group 26' is also driven e.g. by a stepper motor to move forward along the optical axis A.

On the other hand, when the component parts constituting the barrel section is driven by the rotation of the drive gear 30, the prism drive gear 39 is also driven by the rotation of the drive gear 30 at the same time. As the differential barrel 32 having received the driving force of the motor 27 is moved along the optical axis A, i.e. as the cam pin 32a of the differential barrel 32 slides in the first cam section 31a-1, the engaging pin 39a of the prism drive gear 39 rotates to move toward the driven groove 38c. In this case, although the first lens group 25' and the prism 9 share the same motor 27 as a drive source, the first lens group 25' receives driving force, but the prism 9 does not.

Then, when the differential barrel 32 stops moving along the optical axis A and enters a state where only rotation is performed, i.e. when the engaging pin 39a starts sliding in the second cam section 31a-2, the engaging pin 39a is brought into engagement with the driven groove 38c. The cam action between the engaging pin 39a and the driven groove 38c causes counterclockwise pivotal motion of the prism drive lever 38 about the engaging hole 38b. In accordance with the pivotal motion of the prism drive lever 38, the prism 9 shifts from the standby position, shown in FIG. 4, radially outside the fixed barrel 31 through the cutout 31b of the same to the shooting position (see FIG. 5) radially inside the fixed barrel 31, where the prism 9 can receive light rays incident thereon along the optical axis A.

The above-described interlock between the lens drive mechanism and the prism drive mechanism enables the lens barrel 100 to shift from the accommodated state shown in FIG. 4 to the shooting position shown in FIG. 5, and vice versa.

According to the present embodiment, it is possible to enable the extendable lens barrel 100 which is capable of achieving high zoom magnification to shift the prism 9 from the standby position to the shooting position in a manner interlocked with extension of the barrel section, and to shift the prism 9 from the shooting position to the standby position in a manner interlocked with retraction of the barrel section. Therefore, the component parts constituting the barrel section can be retracted and accommodated in the space occupied by the prism 9 in the shooting position but emptied by the shift of the prism 9 to the standby position, which makes it possible to achieve high zoom magnification and reduction of the thickness of the lens barrel.

Further, since the prism 9 can be moved from the position radially inside the fixed barrel 31 to the position radially outside the same through the cutout 31b, it is possible not only to avoid impairing the appearance of the lens barrel 100, but also to maintain sufficient strength of the barrel section.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2008-203184 filed Aug. 6, 2008, which is hereby incorporated by reference herein in its entirety.

What is claimed is:

1. An image pickup apparatus comprising:
   a first lens group that is movably disposed on an object side on a first optical axis;
   a second lens group that is movably disposed inward of the first lens group on the first optical axis, second lens group comprising a plurality of lenses, a drive frame drivingly controlled along the first optical axis, and a lens holding frame for holding the plurality of lenses; and a reflective optical element that is disposed on the first optical axis, and is configured to bend a light flux incident thereon along the first optical axis to thereby guide the light flux along a second optical axis, and to be retracted along the second optical axis when the image pickup apparatus is brought to a non-shooting state, wherein the lens holding frame has an abutment portion which is urged by the first lens group for retraction when the image pickup apparatus is brought to the non-shooting state, and wherein when the image pickup apparatus is in the non-shooting state, at least the second lens group is accommodated, for retraction, in a space defined by the drive frame and a rear part of the lens holding frame, and a space which the reflective optical element occupies when the image pickup apparatus is in a shooting state.

2. The image pickup apparatus according to claim 1, wherein a part of the lens holding frame is retracted into the space which the reflective optical element occupies when the image pickup apparatus is in the shooting state.

3. The image pickup apparatus according to claim 1, wherein the lens holding frame is coupled to the drive frame by a resilient force.

4. The image pickup apparatus according to claim 1, wherein the first lens group and the reflective optical element are driven by a same drive source, and a region exists where the reflective optical element is not driven when the first lens group is being moved along the first optical axis.

5. The image pickup apparatus according to claim 1, wherein the first lens group and the reflective optical element are driven by a same drive source, and a region exists where the first lens group is not moved along the first optical axis when the reflective optical element is being driven along the second optical axis.

6. The image pickup apparatus according to claim 1, wherein the lens holding frame and the drive frame are coupled to each other by a resilient force, the image pickup apparatus further comprising a restriction member configured to restrict the drive frame from moving in a direction for releasing the coupling when the image pickup apparatus is in the shooting state.

7. The image pickup apparatus according to claim 6, comprising a release mechanism configured to release the restriction by the restriction member, when the image pickup apparatus is brought from the shooting state to the non-shooting state.

* * * * *